Sept. 22, 1959        H. L. MYERS        2,905,332

DISPLAY DEVICE

Filed July 10, 1956        2 Sheets-Sheet 1

*INVENTOR.*
*HAROLD L. MYERS*
BY
*Robert Irving Williams*
*ATTORNEY*

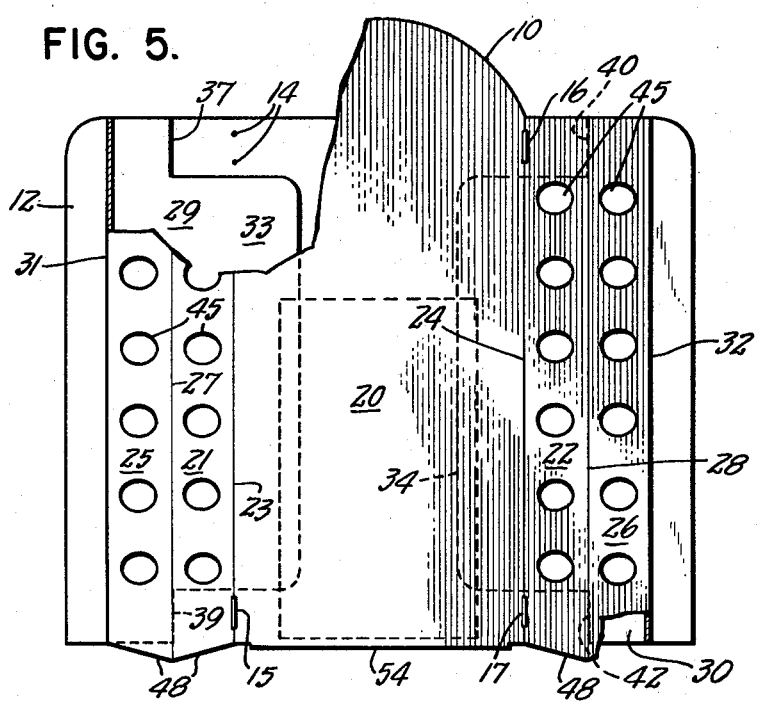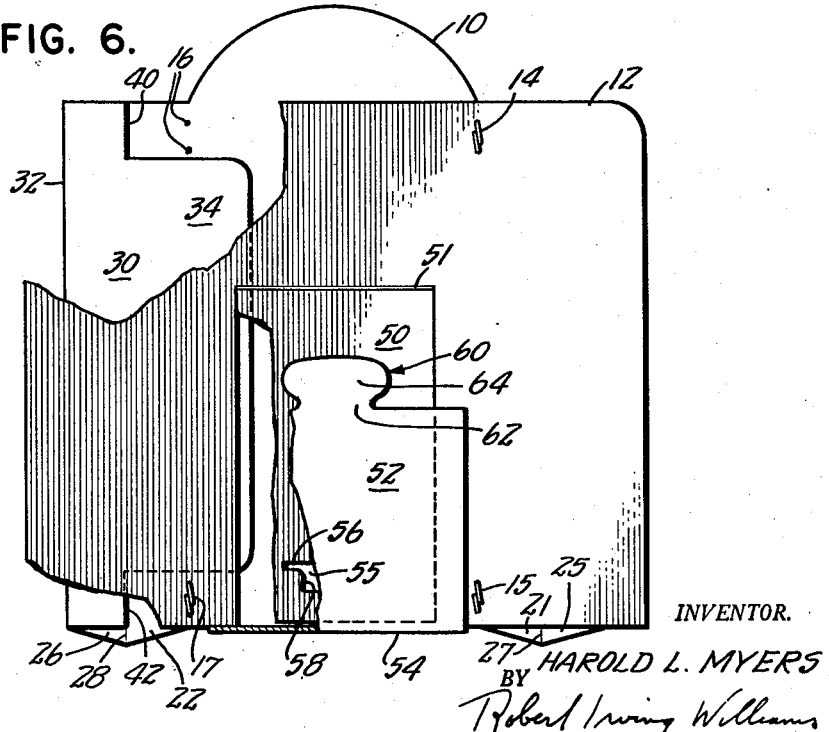

United States Patent Office 2,905,332
Patented Sept. 22, 1959

2,905,332

DISPLAY DEVICE

Harold L. Myers, Morristown, N.J.

Application July 10, 1956, Serial No. 596,882

6 Claims. (Cl. 211—60)

This invention relates to display devices, and more particularly to collapsible display devices formed of cardboard or the like and adapted to support and display articles for sale.

Devices of this type are ordinarily shaped and stored in flat collapsed position and used in an article-retaining position in which parts of the device protrude at one or more faces thereof. In the provision of such devices, not only is it important that the articles be firmly supported by certain of the movable parts when the devices is in display position, but it is also highly important that parts of the device be movable between collapsed and display positions with extreme ease and that the device be simple and inexpensive of construction.

With the foregoing and other considerations in view, the invention contemplates the provision of a device comprising a pair of rigid panels movable between a collapsed position in which they lie in a single plane overlying a support and a display position in which they form in cross-section a triangle with a base panel which shifts laterally during the movement between collapsed and display positions.

In various of its more specific aspects, the invention contemplates the provision of a plurality of sets of display means, the provision of collapsible easel means for the display device, and the provision of constructional features which cooperate in the performing of the purposes of the device.

The invention accordingly comprises an article of manufacture possessing the features, properties, and the relation of elements which will be exemplified in the article hereinafter described and the scope of the application of which will be indicated in the claims.

Figure 1:
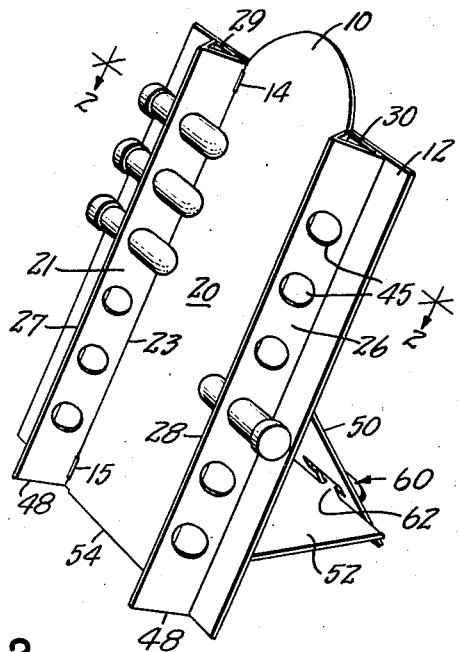
Figure 2:
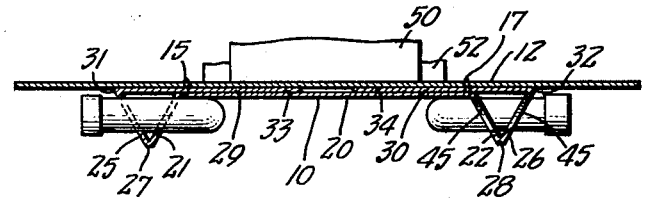
Figure 3:
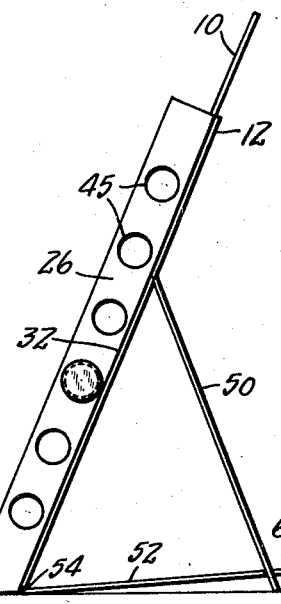
Figure 4:
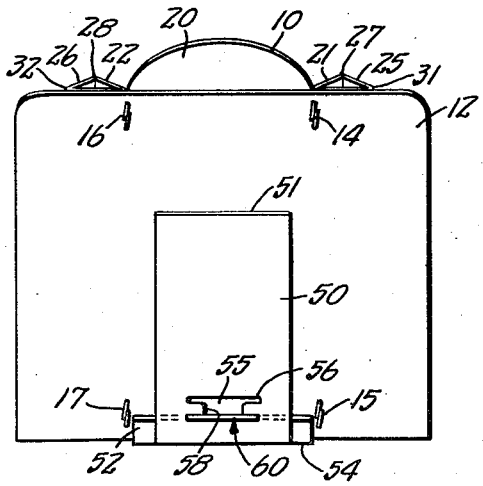

For a fuller understanding of the nature and objects of the invention, reference should be made to the following detailed description taken in connection with the accompanying drawings, in which:

Figure 1 is a perspective view of the device in use;
Fig. 2 is a section on the line 2—2 of Fig. 1;
Fig. 3 is an end view thereof;
Fig. 4 is a rear view thereof;
Fig. 5 is a front view of the device in collapsed position, certain of the portions thereof being cut away; and
Fig. 6 is a rear view of the device in collapsed position, certain of the portions thereof being cut away.

There is exemplified a display device comprising a front sheet of cardboard 10 and a rear sheet of cardboard 12 secured together as by wire staples 14 and 15 along an upwardly and rearwardly inclined line spaced inwardly from the edges of the sheets at one side thereof, and, in the present instance, also by a pair of staples 16 and 17 along an upwardly and rearwardly inclined line spaced inwardly from the other side edges of the sheets.

As exemplified, the sheet 10 is formed to provide two upwardly and rearwardly inclined display portions exteriorly of the lines on which the staples are provided, but it will be appreciated that a single display portion may be provided without departing from the invention in its broader aspects. In the present instance, the front sheet 10 is formed to provide a central or main panel 20, first display panels 21 and 22 connected thereto by upwardly and rearwardly inclined fold lines 23 and 24 exteriorly of—in the present instance at—the lines in which the securing staples lie, second display panels 25 and 26 connected respectively with the panels 21 and 22 by upwardly and rearwardly inclined fold lines 27 and 28, and sliding panels 29 and 30 connected with the panels 25 and 26 respectively by upwardly and rearwardly inclined fold lines 31 and 32. The panel 29 terminates in a tab 33 which extends between the front and rear sheets intermediate the staples 14 and 15, and the panel 30 terminates in a tab 34 which extends between the front and rear sheets intermediate the staples 16 and 17. The panels 21 and 25 are adapted to be moved from a collapsed position as shown in Fig. 5 wherein they lie in a plane overlying the plane of the panel 29, which in turn overlies the rear sheet, and a display position wherein they form in cross-section a triangle the base of which is provided by the panel 29. The panels 22 and 26 are similarly adapted to be moved between similar collapsed and display positions.

The panel 29 is formed with shoulders 37 and 39 to provide stops engaging the staples 14 and 15, respectively, when the panel 29 has been slid inwardly to bring the panels 21 and 25 into display position, and the panel 30 is formed with shoulders 40 and 42 to provide stops engaging the staples 16 and 17, respectively, when the panel 30 has been slid inwardly to move the panels 22 and 26 into display position. The display members 21—25 and 22—26, while readily movable between collapsed and display positions, are frictionally held in position by the friction of the sheets 10 and 12 upon the panels 29 and 30, respectively, due to the fact that the sheets 10 and 12 are drawn tightly together by the staples. Accordingly, when the display members are in display position, they are firmly held therein.

Both, or at least one, of the panels 21 and 25 are provided with means to hold articles in display position. In the present instance, each of these is formed with rows of alined holes 45 thru which lipstick holders may be inserted for display and sale. Similarly, both, or at least one, of the panels 22 and 26 are provided with means to hold articles in display position. In the present instance, each of these is formed with rows of alined holes 45 thru which lipstick holders may be inserted for display and sale.

In the particular form of construction exemplified there is provided, in accordance with certain of the more specific aspects of the invention, brace means for maintaining the device in an upright display position similar to that of an easel. In the present instance, the lower edges 48 of the panels 21, 25, 22, and 26 are cut on a bias somewhat as shown, in order that the device may rest on a counter in a position leaning somewhat rearwardly from the vertical. In the exemplified form, also, the rear sheet 12 is slitted to provide a brace member 50 connected at its upper end with the remainder of the rear sheet by a horizontal fold line 51, and there is provided at the lower edge of the central panel 20 a tab 52 connected to the panel 20 by a horizontal fold line 54. Means are provided for interconnecting the tab 52 with the brace member 50 to maintain the same in brace position. As exemplified, this means comprises a perforation 55 on the easel member 50 comprising essentially an upper elongated slot 56 and a narrower merging recess 58, and the tab 52 comprises an extension 60 having a narrow neck 62 and wider end 64. The end 64 is adapted to be inserted thru the slot 56 and the neck then dropped into the recess 58 to form a firm and effective easel means which can readily be assembled or disassembled.

As will be seen, the rigid panels 21 and 25, and 22 and 26, each provide a simple, sturdy, and effective retaining means for articles to be displayed, and the entire assembly is extremely simple in construction and appearance, economical to manufacture, and effective in use.

Since certain changes may be made in the above article and different embodiments of the invention could be made without departing from the scope thereof, it is intended that all matter contained in the above description or shown in the accompanying drawings shall be interpreted as illustrative and not in a limiting sense.

I claim:

1. A display device comprising a flat rear sheet, a main panel overlying said rear sheet and secured thereto near opposite periferal portions thereof but not at intermediate portions thereof, a sliding panel frictionally but slidably held between said intermediate portions, a first display panel foldably connected with the main panel, and a second display panel foldably connected with the first display panel and the sliding panel, said first display panel and said second display panel being movable upon the sliding movement of the sliding panel between a position wherein they lie flat in the same plane and a position in which they form with the sliding panel a display construction which is triangular in cross-section, at least one of said display panels being provided with means for retaining articles to be displayed.

2. A display device as in claim 1 wherein said display panels are formed with holes alined on lines lying in a plane parallel to said rear sheet and extending in the direction of sliding movement of the sliding panel for receiving articles to be displayed.

3. A collapsible display device comprising front and rear sheets of cardboard, members for securing said sheets together at at least two spaced upper and lower points interiorly of a portion at one side of each thereof, such portion of the front sheet providing a rigid first display panel disposed exteriorly of said points, a main panel disposed interiorly of said first display panel and connected with said first display panel by a vertical fold line, a rigid second display panel connected with said first display panel by a vertical fold line, and a sliding panel lying against said back panel and connected with said second display panel by a vertical fold line and terminating in a tab extending frictionally between said sheets intermediate said securing means, said display panels being movable between a collapsed position wherein they are in the same plane and a display position wherein they form in cross-section a triangle with said sliding panel, at least one of said first and second panels being provided with means for retaining articles to be displayed, and stops on said sliding panel for abutting said securing members when the panels are in display position.

4. A collapsible display device comprising front and rear cardboard sheets secured together at at least two vertically spaced points on lines disposed interiorly of the side edges thereof, the front sheet being formed with a central panel extending laterally at least to said lines and with outer first display panels connected by vertical fold lines with said central panel, outer second display panels connected by vertical fold lines with said first display panels, and with sliding panels connected by vertical fold lines with said second display panels and extending inwardly against the face of the rear sheet and comprising tabs extending between said rear sheet and said central panel intermediate said points, each of said sets of first display, second display, and sliding panels being movable between a collapsed position wherein the first and second display panels thereof lie in a single plane in front of the plane of the sliding panel thereof and a display position wherein they form in cross-section a triangle with the sliding panel thereof, at least one of the first and second display panels of each set being provided with retaining means for articles to be displayed, and stop means on the sliding panel of each set adapted to extend adjacent to said points when the panels of its set are moved from collapsed position to display position.

5. A collapsible display device comprising two rigid display panels and a rigid sliding panel interconnected by a pair of fold lines enabling said display panels to be moved from a collapsed position in which they overlie the sliding panel to a display position wherein said display panels form with said sliding panel in cross-section a triangle, at least one of said display panels being provided with means for retaining articles to be displayed, a rear member underlying said sliding panel, a member overlying said rear member and foldably connected to one of said display panels, and a portion extending from said sliding panel and adapted to be slidably frictionally engaged between said rear member and said overlying member.

6. A display device as set forth in claim 5 wherein there is provided on at least one of the rear and overlying members and on said sliding panel mutually contacting means for limiting of sliding movement of the sliding panel as said display panels reach display position.

References Cited in the file of this patent

UNITED STATES PATENTS

| | | |
|---|---|---|
| 686,063 | Hecker | Nov. 5, 1901 |
| 689,667 | Blakeslee | Dec. 24, 1901 |
| 1,651,748 | Blyth | Dec. 6, 1927 |
| 2,222,665 | Hoenigsberg | Nov. 26, 1940 |
| 2,391,081 | Von Hofe | Dec. 18, 1945 |
| 2,592,189 | Rothrock | Apr. 8, 1952 |
| 2,600,429 | Ranseen | June 17, 1952 |